Patented Nov. 3, 1925.

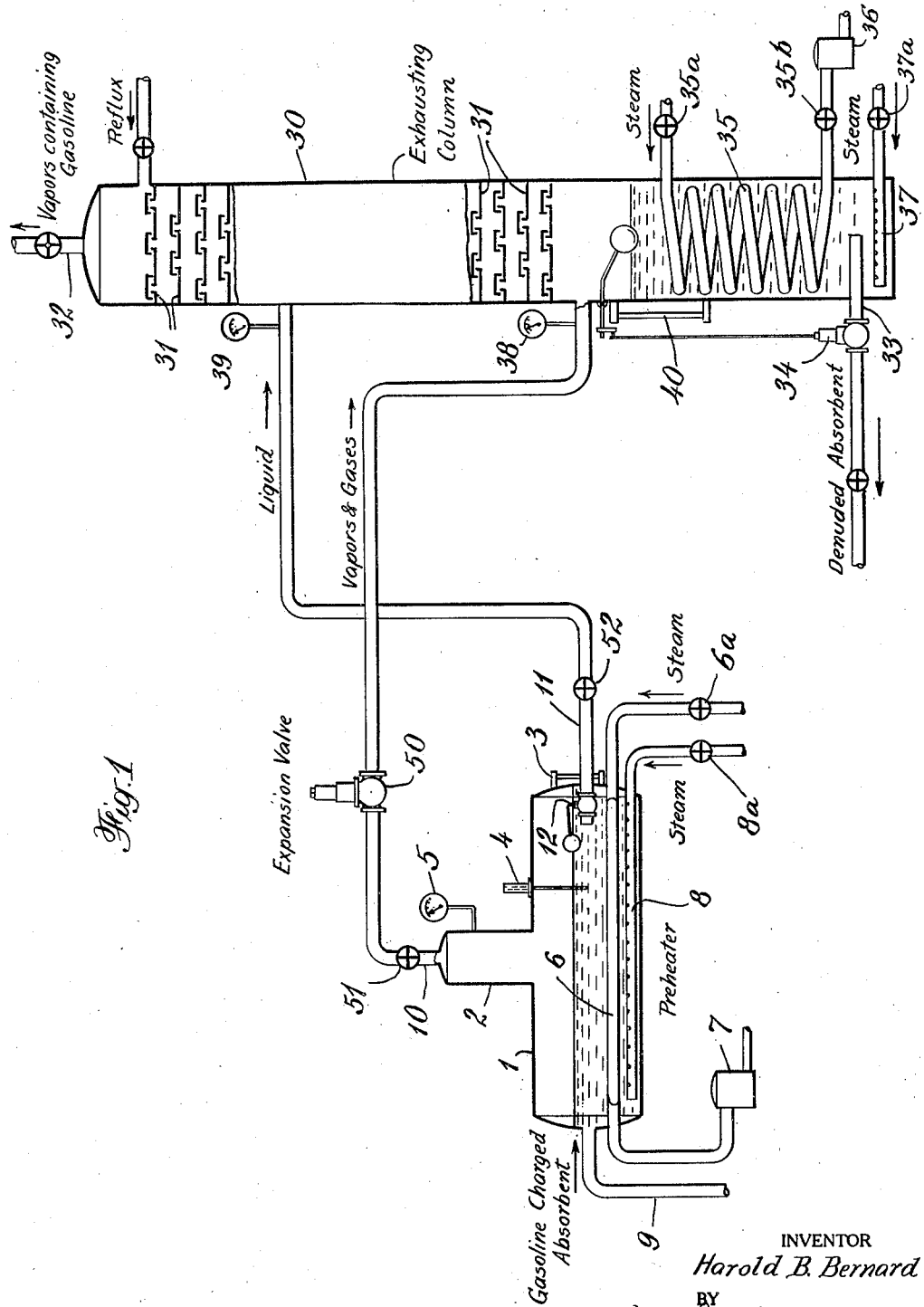

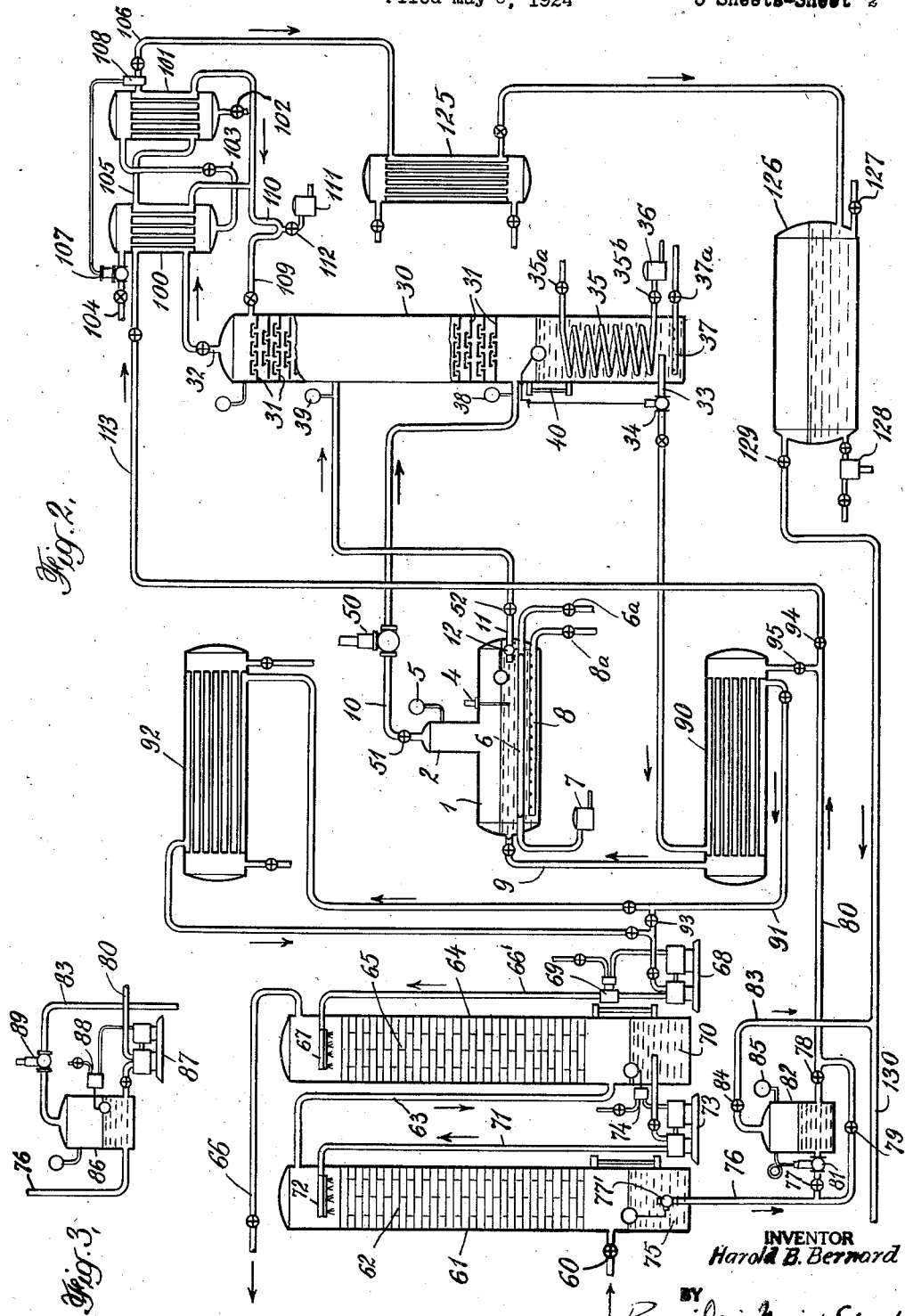

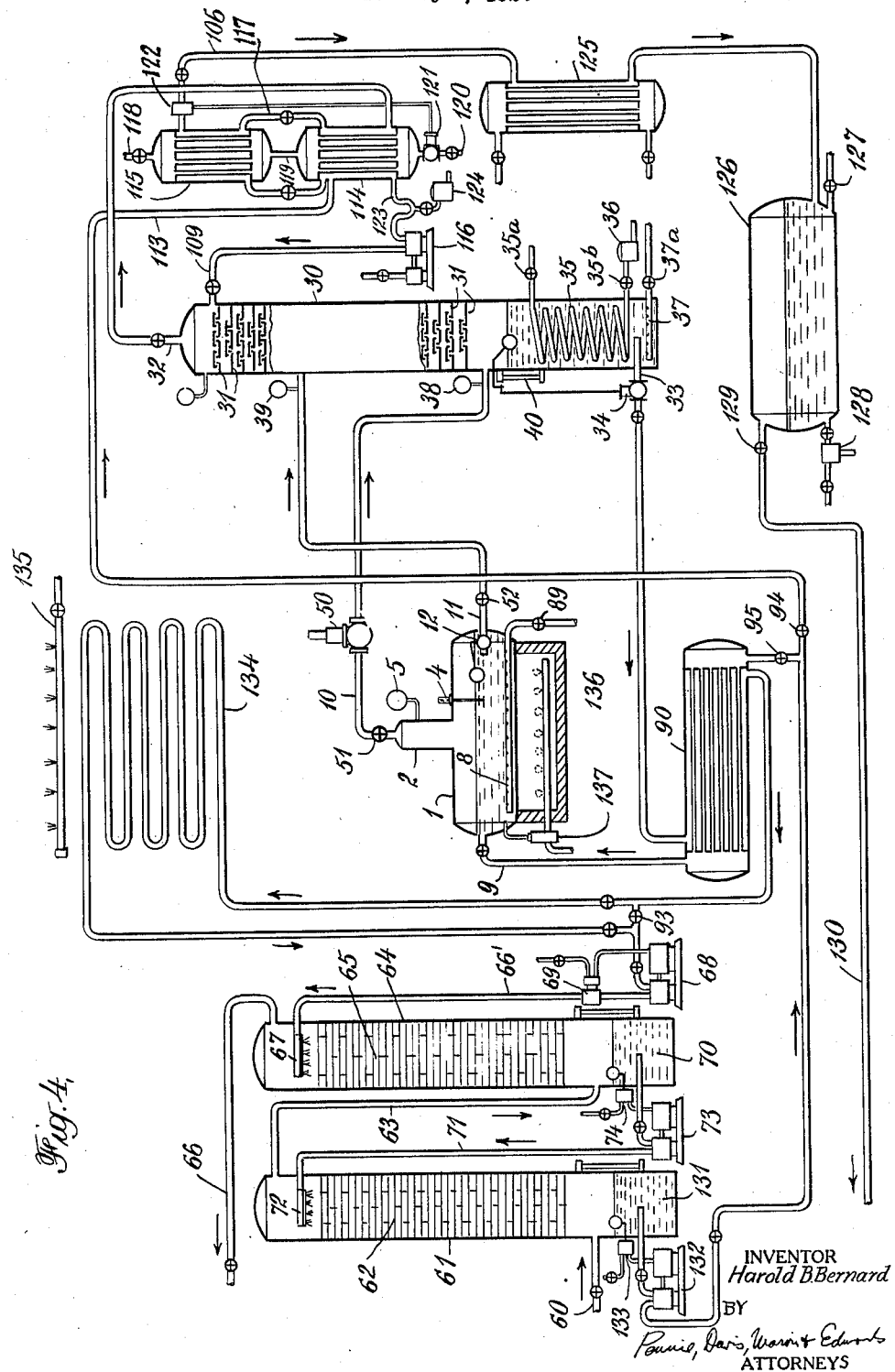

1,560,137

UNITED STATES PATENT OFFICE.

HAROLD B. BERNARD, OF TULSA, OKLAHOMA, ASSIGNOR TO SINCLAIR OIL AND GAS COMPANY, OF TULSA, OKLAHOMA, A CORPORATION OF MAINE.

RECOVERY OF GASOLINE, ETC.

Application filed May 8, 1924. Serial No. 711,779.

*To all whom it may concern:*

Be it known that I, HAROLD B. BERNARD, a citizen of the United States, residing at Tulsa, Oklahoma, in the county of Tulsa, State of Oklahoma, have invented certain new and useful Improvements in Recovery of Gasoline, Etc.; and I do hereby declare the following to be a full, clear, and exact description of the invention, such as will enable others skilled in the art to which it appertains to make and use the same.

This invention relates to the recovery from natural gas and casinghead gas of liquid mixtures of hydrocarbons of the type commonly known as natural gas gasoline, natural gasoline, and casinghead gasoline. These liquid hydrocarbon mixtures are of a light gasoline character and are particularly adapted for use in blended motor fuels in admixture with heavier hydrocarbons.

Among the objects of the invention are the provision of improved processes for the recovery of such hydrocarbons and the improvement of the hydrocarbon products obtained.

More particularly, this invention relates to an improved method for use in the recovery of natural gas gasoline and the like by absorption in a liquid absorbing medium, and to an improved method for separating the absorbed vapors from the liquid absorbent; and the invention includes improvements in the separation of absorbed gasoline and improvements in the complete process.

Briefly, in recovering natural gas gasoline from natural gas, or similar gaseous mixtures, by absorption in a liquid menstruum, the natural gas is subjected to treatment with a liquid absorbent capable of selectively dissolving or entraining the gasoline constituents, the stripped gas and the absorbent charged with gasoline are separated, the absorbed gasoline, or as great a part as possible or practicable, is distilled from the absorbent, the denuded absorbent is cooled and returned for further treatment of an additional quantity of natural gas, and the separated gasoline is condensed and collected.

According to the present invention, the liquid absorbent employed in extraction of the gasoline content from the natural gas is treated to effect a more complete separation or stripping of the absorbed gasoline from the absorbing medium; and the efficiency of the entire operation, including the absorption of the gasoline from the natural gas and the separation of the absorbed gasoline from the absorbing medium, is improved. Rectification of the separated gasoline to separate admixed absorbent may, with advantage, be combined with the distillation treatment for separating the gasoline from the absorbing medium.

According to the process of the present invention, the liquid absorbent charged with absorbed gasoline following the absorption treatment is preheated or subjected to a preliminary distillation treatment under pressure wherein an initial separation of gases, vapors and liquid is effected, the pressure upon the separated gases and vapors and the liquid is reduced, and the preheated liquid is then passed in counter current flow and in direct contact with the preheated gases and vapors under a lower pressure than that prevailing during the preliminary distillation treatment.

By subjecting the gasoline charged absorbent to an initial distillation treatment under pressure, and thereafter directly contacting in counter current flow and under reduced pressure, the gases and vapors and the liquid residuum separated in the initial treatment, the efficiency of the entire distillation treatment is improved and a more complete stripping of the gasoline from the liquid absorbent is effected. By a more complete stripping of the absorbent, the amount of liquid absorbent employed, with reference to the amount of natural gas treated or the amount of gasoline extracted, may be reduced and an increased plant capacity secured; and, due to the decrease in the relative amount of absorbent required, important heat economy is effected since the relative amount of recirculating liquid absorbent alternately heated and cooled in the cycle of the complete process is decreased for any given recovery of gasoline or for the treatment of any given amount of natural gas. In addition to saving fuel, the relative decrease in the amount of liquid absorbent alternately heated and cooled is an important advantage where cooling water of adequate quality is not readily available in unlimited amount. The relative decrease in the amount of circulating liquid absorbent used for any given recovery or for the treatment of any given amount of natural gas also reduces the amount of apparatus and power required.

Under reduced pressure, the hot vapors and gases, which include in addition to the gasoline constituents lighter vapors and gases originally absorbed in the absorbent, have additional absorbing capacity for the gasoline vapors, and the hot residuum more readily gives up the absorbed gasoline remaining in solution. When the pressure is reduced, a large part of the absorbed gasoline remaining in the liquid residuum is vaporized. Any of the gasoline constituents not so vaporized comprise the heaviest of the gasoline constituents, and are then vaporized by the hot gases and vapors directly contacting in countercurrent flow with the liquid residuum. This secondary vaporization of the gasoline constituents is apparently due, in part, to the heat of the vapors and gases, and, in part, to the reduction of the partial pressure of the heavy absorbed constituents, the hot vapors and gases initially comprising principally the lightest vapors and gases. These factors combine to increase the efficiency and completeness of the separation. In some cases, the increased efficiency of the separation permits the use of materially lower temperatures. More complete stripping of the liquid absorbent also tends to promote the uniformity of the gasoline product and assists in obtaining a high recovery.

The separated vapors and gases containing the gasoline constituents may be subjected to a rectification treatment following the distillation treatment for exhausting or denuding the liquid absorbent, and, before final condensation, the rectified vapors may be subjected to dephlegmation and the dephlegmate returned or refluxed to the rectification treatment and the exhausting treatment. Dephlegmation may be controlled and in part effected by the direct introduction into the vapors and gases undergoing dephlegmation of a regulated part of the gasoline-charged liquid absorbent. The heat exchange in the dephlegmation tends to vaporize the absorbed gasoline, and where the dephlegmate, in this case including the absorbing menstruum, is returned to the rectification or exhausting treatment, the further removal of any retained gasoline constituents is effected in these latter treatments. This mode of operation is of advantage where a somewhat broader final gasoline fraction is desired.

The process of the invention can be practiced in various forms of apparatus. One form of apparatus adapted for carrying out the invention comprises a preheater or a preliminary still, adapted to be maintained under pressure, a receptacle through which the liquid residuum from the preliminary still or preheater is passed in counter current flow and in direct contact with the vapors and gases from the preliminary still or preheater for exhausting the liquid residuum, appropriate connections between this receptacle and the preliminary still or preheater, and means for maintaining and regulating the pressure on the preheater or still and for reducing the pressure between the preheater or preliminary still and the exhausting receptacle and for maintaining a lower pressure in the exhausting receptacle.

The preliminary still or preheater may be a still of ordinary construction adapted to withstand the pressure employed and may be heated by direct fire or by submerged steam coils or by flues through which heating gases are passed. In practice, a horizontal fire tube boiler can be employed although requiring a closer regulation of the liquid level than a shell or liquid tube type of still. Connections may also be provided for the direct introduction of steam into the liquid charge, particularly where it is desirable to use lower temperatures in the preheater. Automatic or semi-automatic means may also be employed for controlling the temperature and the liquid level.

The exhausting column may be a bubble tower or baffle tower of conventional construction or a helical tower of the type described in the application of John E. Bell filed Apr. 1, '24, Serial No. 703,338 or other tower of similar function adapted to promote intimate contact and heat exchange between downwardly flowing liquid and upwardly flowing vapors and gases. Connections are provided for discharging the liquid residuum from the preheater into the upper part of this column and the vapors and gases from the preheater into the lower part of this column. By arranging the inlet connection for the liquid residuum spaced below the top of the tower, the upper part of the tower above this inlet connection can be employed as a rectifier for the separated gasoline constituents. The vapors and gases containing the separated gasoline are withdrawn from the top of the exhausting tower, and the denuded liquid absorbent collects in the lower end of the tower, from which it is withdrawn for further use.

The pressure upon the vapors and gases may be reduced by the interposition of a valve in the connection conducting the vapors and gases to the exhausting tower. A manually operated valve, operated in accordance with the pressure in the preheater, or a sensitive automatic expansion valve may be used for this purpose. The pressure upon the liquid residuum may be reduced by means of a valve between the still and the exhausting tower. This valve may be operated by level-operated means in the preheater, thus cooperating with the expansion valve in the vapor and gas connection in controlling the pressure reduction and the liquid level in the preheater. Or the point of discharge of the liquid residuum into the exhausting tower may be arranged at a point sufficiently elevated above the liquid level in the preheater so that the column of liquid between the liquid level in the preheater and the inlet into the tower imposes the desired additional pressure. A level-operated valve may be employed in combination with such an elevated discharge for controlling the rate of discharge of liquid residuum into the tower.

Where a tower is employed as the exhausting receptacle, it is advantageous to employ an elevated discharge, either alone or in combination with a pressure reducing valve, for reducing the pressure between the preheating still and the exhausting tower and to use the pressure in the preheater for forcing the liquid residuum into the upper part of the exhausting column. Hot oil is difficult to pump, and, by utilizing all or a part of the excess pressure prevailing in the preliminary still to circulate the hot liquid residuum to the exhausting column, pumping of the hot liquid residuum can be avoided.

The upper end of the exhausting tower may be provided with cooling coils or other cooling surfaces and the dephlegmation effected within the upper end of the tower, or the vapors and gases escaping from the upper end of the tower may be conducted through one or more cooled vessels before being subjected to final condensation. Where a separate dephlegmating vessel is employed, the dephlegmate can be returned to the rectifying section of the tower, that is the section above the hot liquid residuum inlet, to assist in the rectification therein. A valved connection may also be provided for introducing a regulated part of the gasoline charged menstruum into direct contact with the vapors and gases in one or more of the dephlegmators to assist or to regulate the dephlegmation.

The invention will be further described in connection with the accompanying drawings illustrating embodiments of apparatus adapted for use in practicing the process of the invention; but it is intended and will be understood that the invention is illustrated, not limited, by this further description and illustration.

In the accompany drawings:

Fig. 1 diagrammatically represents in elevation and partly in section an apparatus for separating absorbed gasoline from a liquid absorbing medium in accordance with the invention, Fig. 2 diagrammatically represents in elevation and partly in section a system for gasoline recovery embodying the invention and adapted for carrying out the invention, Fig. 3 is a modified form of one of the elements of the system illustrated in Fig. 2, and Fig. 4 diagrammatically represents in elevation and partly in section a somewhat modified system for gasoline recovery embodying the invention and adapted for carrying out the invention.

Referring to Fig. 1, the preheater or preliminary still comprises a shell 1 having a vapor dome 2 and is provided with the usual accessories including a level gauge 3, a thermometer 4 and a pressure gauge 5. A steam coil 6 connected on its discharge end with a steam trap 7 is provided below the normal liquid level for heating the contents of the still and a perforated pipe 8 extending along the bottom of the shell is provided for introducing steam directly into the charge in the preheater. Valves 6$^a$ and 8$^a$ are provided for controlling the steam coil 6 and the steam injection pipe 8 respectively. Connection 9 is provided for introducing the gasoline charged absorbent into the preheater. The liberated vapors and gases escape from the preheater through connection 10 and the hot liquid residuum is discharged through connection 11. A float actuated valve 12 is provided on the outlet to the connection 11 for maintaining the liquid level in the preheater between the desired limits.

The exhausting column illustrated in Fig. 1 is of bubble tower construction and comprises a vertical shell 30 having an extended series of bubble plates 31 therein and is arranged with a liquid reservoir in the lower end. The connection 10 from the preheater enters the tower below the lowermost bubble plate and the connection 11 is arranged to discharge into the tower at a point above the liquid level in the preheater and somewhat below the uppermost bubble plate. The space within the tower between the connections 10 and 11 thus serves as the exhausting receptacle and the space above the connection 11 as a rectifying receptacle. The gasoline containing vapors from the rectifier escape through connection 32 and the denuded absorbent is withdrawn through connection 33. A float actuated valve 34 is provided in the outlet 33 to maintain the level in the liquid reservoir at the base of the column below the gas and vapor inlet and above the outlet 33. A steam coil 35 for supplying additional heat, for example, to make up for heat losses in the connections between the preheater and the exhausting column, is provided in the lower part of the column. The steam coil is controlled by valves 35$^a$ and 35$^b$ and is connected on its outlet end with steam trap 36. A perforated pipe 37 controlled by valve 37$^a$ is also provided in the base of the tower for the direct introduction of live steam. Pressure gauges 38 and 39 are provided in the connections 10 and 11 respectively adjacent the inlets to the column and a level gauge 40 is provided for indicating the liquid level in the liquid reservoir.

In the connection 10, conducting the vapors and gases from the preheater to the lower part of the exhausting column, a sensitive expansion or pressure reducing valve 50 is interposed. A manually operated valve 51 is also provided in this connection, and may be employed to supplement the regulation of the valve 50. The outlet of the connection 11, conducting the liquid residuum from the preheater to the upper part of the exhausting column, is elevated a substantial distance above the liquid level in the preheater. The vertical distance between the outlet of connection 11 and the normal liquid level in the preheater may be adjusted to maintain the desired additional pressure in the preheater; or where pressure in excess of that imposed by this liquid column is desired, a supplementary regulating valve is interposed. Where the elevation of the outlet to connection 11 is adjusted to impose the desired additional pressure, the float actuated valve 12 serves to regulate the rate of discharge and to maintain the liquid level in the preheater, or where the elevation of the outlet is insufficient to maintain the desired pressure, the valve 12 also acts to regulate the pressure reduction. The regulation of the valve 12 may be supplemented or replaced by a regulating valve 52.

In operation, the gasoline charged absorbent is continuously introduced into the preheater where it is heated under pressure and a partial vaporization of the absorbed constituents is effected. Where heat is applied only in the preheater, sufficient heat, that is the quantum of heat, should be introduced to vaporize all of the gasoline content from the absorbent and to make up for any heat losses, although complete vaporization of the absorbed gasoline constituents is not effected in the preheater. Where heat is applied at other points, as in the exhausting column, the amount of heat introduced in the preheater may be somewhat less. Sufficient vaporization may also be effected at a somewhat lower temperature by the direct introduction of steam. Due to the relatively higher pressure in the preheater, a selective vaporization of the lighter absorbed constituents is effected therein and vaporization or entrainment of the absorbent is avoided or minimized, even where a relatively light absorbent is employed. The pressure upon the vapors and gases and the liquid is then reduced and the heated and separated absorbed constituents are discharged into the lower part of the exhausting column under reduced pressure and the heated liquid residuum containing the heavier absorbed constituents is forced into the upper part of the exhausting column by the pressure in the preheater. In the exhausting column, the descending heated liquid residuum is directly contacted in counter current flow with the ascending heated vapors and gases under a relatively lower pressure, and the liquid absorbent is substantially completely denuded of its remaining content of absorbed gasoline. In the section of the tower above the liquid residuum inlet the separated vapors containing the gasoline are subjected to rectification and any entrained or vaporized absorbent is separated from the gasoline. If for any reason, additional heat is required to complete the stripping of the absorbent, such as heat losses between the preheater and the exhausting column or too great cooling of the exhausting column because of the expansion or vaporization of the vapors and gases or the liquid residuum upon reduction of pressure, steam is supplied to the heating coil in the base of the column or passed directly up through the column through the perforated pipe at the base of the tower. This perforated pipe is shown in the drawing at the lower part of the liquid reservoir in the base of the exhausting column and steam discharged therethrough bubbles up through the liquid absorbent collecting in the reservoir. This direct steam inlet may also be arranged above the liquid level in the reservoir and directly introduced steam passed upwardly through the exhausting column with the vapors and gases from the preheater without being bubbled through the denuded absorbent.

Figs. 2 and 4 diagrammatically illustrate a complete system embodying the invention for recovering gasoline from natural gas or casinghead gas in accordance with the process of the invention. In carrying out the process of the invention in the apparatus of the type illustrated in Figs. 2 and 4, the natural gas or casinghead gas containing the gasoline to be absorbed is passed through absorbing towers wherein it is contacted with the cooled liquid absorbent, the charged absorbent is passed through a heat exchanger to a preheater in which an initial separation of gases and vapors is effected, by distillation under pressure, the pressure upon the separated vapors and gases and liquid is reduced, the separated gases and vapors and the liquid residuum are passed in countercurrent and in direct contact in an exhausting column in which the absorbent is substantially completely removed, the denuded absorbent is circulated through the heat exchanger giving up a part of its heat to the charged absorbent entering the preheater and after further cooling, if necessary, is returned to the absorbers, the vapors and gases separated from the absorbent in the exhausting column are passed through a rectifier and thence through one or more dephlegmators, any dephlegmate is returned to the rectifier and exhausting column, and the final gasoline fraction escaping from the dephlegmators as a vapor is condensed and collected.

Referring to Fig. 2, the natural gas or casing head gas containing the gasoline vapors is introduced through connection 60 into the lower part of the first absorbing tower 61, passed upwardly through baffles or filling material 62, conducted from the top of the first tower to the lower part of the second absorbing tower 64 through connection 63 and passed upwardly through baffles or filling material 65 therein, and the stripped gas is exhausted from the upper end of the second tower through connection 66. The fresh liquid absorbing medium is introduced into the top of the second absorbing tower through connection 66' and sprayhead 67 by means of pump 68. A governor 69 is provided actuated by a flow-rate mechanism in the connection 66' for controlling the operation of the pump 68 so as to maintain a constant rate of flow of the liquid absorbing medium. In the absorbing tower 64, the liquid absorbent is distributed over the filling material through the sprayhead and is passed downwardly in direct contact and in countercurrent flow with the ascending partially stripped gas from the first absorbing tower. The partially charged absorbent collects in the liquid reservoir 70 in the lower part of the tower 64 and is introduced into the top of the first tower through connection 71 and sprayhead 72 by means of pump 73. A float actuated governor 74 is provided for controlling the operation of the pump 73 to maintain the liquid level in the reservoir 70, above the outlet connection to the pump 73 and below the gas inlet of connection 63. In the tower 61 the partially charged absorbent is passed downwardly in countercurrent flow and in direct contact with the ascending fresh gas. The charged absorbent collects in the liquid reservoir 75 in the lower part of the tower 61. From the reservoir 75 the charged absorbent is discharged through connection 76 in which a float actuated valve 77' is interposed for maintaining the liquid level in the reservoir below the gas inlet and above the liquid outlet.

Where the pressure prevailing in the absorbing towers is just sufficient to force the charged absorbent through the heat exchanger 90 into the preheater 1 and to maintain the required pressure in the preheater, the valves 77 and 78 are closed and the valve 79 opened, the charged absorbent being discharged directly from the liquid reservoir 75 through connection 80. Where a somewhat higher pressure prevails in the absorbers and it is desirable to reduce the pressure between the absorbers and the preheater, the valve 79 is closed and the valves 77 and 78 are opened and the charged absorbent is passed through the reducing valve 81 and the vent tank 82 where the pressure is reduced to the desired value and the liquid absorbent discharged through connection 80, any separated gases and vapors being withdrawn through connection 83, the withdrawal being regulated by means of valve 84. The vent tank may be provided with a level gauge to assist in regulating the withdrawal of vapors and gases and a pressure gauge 85 to assist in regulating the pressure reduction. In place of the arrangement of the vent tank and the expansion valve illustrated in Fig. 2, the arrangement of vent tank and expansion valve illustrated in Fig. 3 may be substituted.

Referring to Fig. 3, the charged absorbent from the reservoir 75 is discharged directly into the vent tank 86 through connection 76. The charged absorbent is withdrawn from the vent tank by means of a pump 87, which acts as a reducing valve, and which is controlled by a float actuated governor 88. An expansion valve 89 in the vent connection 83 serves to reduce the pressure upon any vapors and gases liberated within the vent tank 86. Where a vent tank is employed, as in either Fig. 2 or Fig. 3, some gases and vapors are liberated from the absorbent upon the reduction of pressure, and by withdrawing these from the vent tank a part of the lighter constituents is removed without loading the preheater or preliminary still. The specific heat of such vapors and gases as are liberated is however very low, in many cases entailing only a negligible heat loss, and the vent tank and its auxiliaries may be eliminated by an expansion valve in a discharge line. With a constant flow of liquid absorbent, the float valve 77' may be employed to effect the pressure regulation, or the regulation of the valve 77' may be supplemented or replaced by regulation of a valve between connections 76 and 80, as by regulation of valve 79. With higher pressures in the absorbers it is advantageous to employ a vent tank in the line in conjunction with the pressure reducing means, but with intermediate pressures direct valve control of the pressure reduction is usually satisfactory.

The heat exchanger 90 is of the shell and tube type. The charged absorbent passing through the preheater through connection 80 is circulated through the tubes. The denuded absorbent from the exhausting column is circulated about the tubes and is discharged through connection 91. The denuded absorbent escaping from the heat exchanger 90 is circulated through the cooler 92 on its way to the pump 68. Where the cooling effected in the heat exchanger 90 is sufficient or where it is desirable to limit the degree of extraction effected in the absorbers, as to prevent or reduce the extraction of the lighter vapors and gases, all or a part of the absorbent leaving the heat exchanger 90 may be by-passed around the cooler 92 through valved connection 93. From the heat exchanger 90 the charged absorbent is introduced into the preheater 1 through connection 9.

The operation and construction of the preheater 1 and the exhausting column 30 has been described in detail in connection with Fig. 1. In the preheater a partial vaporization of the absorbed constituents is effected, and, after reduction of pressure, the preheated vaporized constituents and the preheated liquid are discharged into the exhausting column. The preheater 1, in Fig. 2, is shown as heated by a steam coil connected with a steam trap and the temperature within the preheater may be regulated by regulating the pressure of the steam in the coil 6, withdrawing the condensed water from the trap 7. Heat may also be supplied, and, due to the reduction of the partial pressure of the vaporized constituents the temperature of vaporization lowered, by the introduction of direct steam through perforated pipe 8.

The hot liquid from the preheater from which the lighter absorbed constituents have been distilled enters the upper part of the exhausting column 30 and the hot vaporized constituents enter the lower part of the column 30. The vapors and gases bubble upwardly through the descending liquid being scrubbed of any vaporized or entrained absorbent and, under the lower pressure prevailing in the exhaustion, any remaining absorbed constituents are vaporized from the liquid. The denuded absorbent is returned from the reservoir in the lower part of the tower through the heat exchanger 90 and the cooler 92 to the absorbing tower. The vapors and gases separated from the absorbent pass upwardly through the upper section of the tower 30 above the inlet of the connection 11 and undergo rectification therein, the uncondensed vapors and gases escaping to the dephlegmators through connection 32.

Two dephlegmators, 100 and 101, of the shell and tube type are shown in Fig. 2, connected in series with respect to both the cooling fluid and the vapors and gases undergoing dephlegmation, but one or a greater number of dephlegmators of this or other construction may be employed. The cooling fluid enters the second dephlegmator 101 through connection 102, passes through the tubes therein to the first dephlegmator 100 through connection 103, and escapes therefrom through connection 104. The vapors and gases enter the first dephlegmator through connection 32, pass about the tubes therein to the second dephlegmator 70 through connection 105, and escape from the second dephlegmator through connection 106. A thermostatically operated valve 107 is provided in the cooling fluid outlet 104 actuated by the thermostat 108 in the vapor outlet 106 for controlling the cooling and condensation within the dephlegmators. From the dephlegmators any condensate is returned to the upper part of the rectifying section of the column 30 through connection 109 having a liquid seal trap 110 therein. A trap 111 is connected to the lowest point of the seal 110 for removing any water condensed in the dephlegmators where direct steam is employed in the preheater or exhausting column. Where the removal of water at this point is not desired, the valve 112 is closed disconnecting the trap. The reflux returned to the rectifying section of the tower 30 assists in the rectification, and the character of the final product can, within the limits, be controlled by regulation of the character and quantity of reflux. The character and quantity of reflux from the dephlegmators can be controlled by regulation of the temperature and amount of cooling fluid circulated therethrough.

The dephlegmation in the dephlegmators 100 and 101 can also be controlled and in part effected by the introduction into the dephlegmators of a regulated amount of gasoline charged absorbent. In Fig. 2, a connection 113 is shown for by-passing a part of the gasoline charged absorbent from the absorbers 61 and 64 from connection 80 into the first dephlegmator 100. Regulation of the amount of gasoline charged menstruum so introduced into the first dephlegmator is effected by adjustment of valves 94 and 95. The absorbent and any unvaporized part of the absorbed constituents, after passing through the dephlegmator, is returned to the tower 30 with the reflux, and in passing through the tower is stripped of any remaining absorbed gasoline. This stripped absorbent also collects in the reservoir at the base of the tower and is returned to the absorbers through connection 33.

The vapors escaping through connection 106 pass through the condenser 125, shown of the shell and tube type, and the condensate is collected in the receiving drum 126. The finished gasoline product is withdrawn through the valved outlet 127; or where direct steam is employed and the condensate in the drum 126 includes some water, the gasoline product may be withdrawn through the separating trap 128. Any vapors and gases collecting in the receiver are withdrawn through the valved outlet 129, escaping through connection 130.

The apparatus illustrated in Fig. 4 is in several respects sufficiently similar to that shown and described in Fig. 2 so that a separate description is unnecessary with respect to these corresponding features.

As in Fig. 2, the natural gas or casinghead gas enters the first absorbing tower through connection 60 and the stripped gas leaves the second absorbing tower through connection 66. Excepting the means for removing the charged absorbent from the first tower, the operation and construction of these towers and the absorbent circulating pumps are the same as has been described in connection with Fig. 2.

The construction illustrated in Fig. 4 is particularly adapted for carrying out the absorption under relatively low pressure, including pressure lower than that employed in the preheater. The gasoline charged absorbent collects in the reservoir 131 in the lower part of the first tower 61 and is withdrawn therefrom by means of pump 132. A float actuated governor 133 is provided for controlling the operation of the pump 132 to maintain the liquid level in the reservoir 131 above the outlet connection to the pump 132 and below the gas inlet of connection 61. The pump 132 forces the gasoline charged menstruum through the heat exchanger 90 into the preheater 1.

In place of a cooler of the shell and tube type, as illustrated at 92 in Fig. 2, an atmospheric cooling coil 134 over which water or other cooling fluid is distributed from perforated pipe 135 is provided for cooling the returned denuded absorbing medium. An atmospheric cooler is of advantage where cooling water of satisfactory quality for use in a shell and tube type cooler is not readily available or where it is desirable to supplement the cooling action of the sensible heat of the cooling water by the heat of evaporation of part of the water. Likewise, an atmospheric cooler or condenser may be used in place of or as a supplementary cooler in connection with the condenser 125.

The preheater 1 is heated over a gas or oil fired furnace 136 and a thermostatically operated valve 137 is provided for regulating the temperature in the preheater or preliminary still by controlling the rate of combustion in the furnace.

In the apparatus illustrated in Fig. 2, the dephlegmators 100 and 101 are arranged to provide for return of the dephlegmate to the tower 30 by gravity. In the apparatus illustrated in Fig. 4, the dephlegmate is returned to the tower 30 by means of a pump 116. The vapors and gases from the tower 30 enter the first dephlegmator 114 through connection 32, pass about the tubes therein to the second dephlegmator 115 through connection 117, and escape from the second dephlegmator through connection 106. The cooling fluid enters the second dephlegmator through connection 118, passes through the tubes therein to the first dephlegmator through connection 119, and escapes therefrom through connection 120, flowing through the dephlegmators in counter current to the flow of vapors and gases. A thermostatically operated valve 121, in the cooling fluid outlet 120 and actuated by the thermostat 122 in the vapor outlet 106, is provided for controlling the cooling and condensation within the dephlegmators. The dephlegmate collecting in the lower part of the space about the tubes in the lower dephlegmator 114 is withdrawn through connection 123 and forced into the upper part of the tower 30 through connection 109 by means of pump 116. A trap 124, connected to the connection 123 through a valve, is provided for removing any water condensed in the dephlegmators where direct steam is employed in the preheater or exhausting column. Valve controlled connection 113 is provided for introducing gasoline charged absorbent into the lower dephlegmator, the menstruum and any unvaporized absorbed constituents of any absorbent so introduced being returned to the tower 30 by means of pump 116 with the dephlegmate.

In carrying out the complete process of the invention, the natural gas or casinghead gas is first contacted with a liquid absorbent in amount sufficient to remove the major part of the gasoline content of the gas. Increased recovery can be had by increasing the ratio of the amount of absorbent used to the amount of gasoline recovered, but practical considerations, such as the increased amount of power and the larger apparatus required to handle larger amounts of liquid absorbent and the increased amount of heat required to distill the absorbed gasoline from relatively large amounts of liquid absorbent, usually limit the amount that can be employed so that 100% recovery is not commercially practicable. The ratio of the amount of absorbent medium employed to the amount of gasoline present in the gas may be kept fairly constant, and in this case it is advantageous to employ a higher pressure during the absorption treatment in the treatment of a leaner gas than in the treatment of a richer gas. A ratio of 20 gallons of mineral seal oil per gallon of gasoline to be recovered, for example, can be used. A comparatively lean gas, containing for example about 0.10 gallons per 1,000 cubic feet can be stripped, employing this ratio of absorbent to about 0.010 or 0.015 gallons per 1,000 cubic feet under a pressure of about 300 pounds per square inch. A gas containing about 2.25 gallons per 1,000 cubic feet can, with a similar absorbent ratio be stripped to about 0.10 or 0.15 gallons per 1,000 cubic feet under a pressure of about 40 pounds per square inch. Other suitable liquid absorbents for absorbing gasoline from natural gas and casinghead gas comprise, for example, naphtha, kerosene, gas oil, straw oil, light lubricating oil, and cresol. The invention is of particular advantage in the separation of absorbed gasoline from lighter and lower boiling absorbents. The ratio of absorbent to gasoline to be employed varies with the recovery desired and other factors such as the practical limits referred to above. In general, the absorptive capacity of lighter hydrocarbons is higher than of similar heavier hydrocarbons, and with a lighter hydrocarbon absorbing medium the ratio can be somewhat decreased. The recovery of gasoline from the natural gas or casinghead gas can also be increased by lowering the temperature of the absorbent or by increasing the pressure in the absorbers.

With a mineral seal oil absorbent containing approximately 5% of absorbed gasoline, a temperature of from 400° F. to 450° F. may be maintained in the preheater in conjunction with a pressure of about 20 pounds per square inch, where direct steam is not employed. With direct steam a somewhat lower temperature can be used. The temperature in the preheater is adjusted in accordance with the amount of heat it is necessary to introduce in the preheater to effect complete separation in the exhausting column. The pressure in the preheater is adjusted, with reference to the temperature, in accordance with the amount of partial vaporization desired in the preheater, the vaporization being less, in any given case, the higher the pressure. Between the preheater and the exhausting column the pressure is reduced so that, with the total amount of heat available, complete separation of the absorbed gasoline is effected in the exhausting column. With a pressure in the preheater of 20 pounds per square inch, the pressure in the exhausting column may be maintained at a value just sufficient to force the vapors and gases through the dephlegmators and condenser to the receiver, say for example 5 pounds per square inch.

The gas and vapors collecting or liberated in the receiver for the condensed gasoline product may be withdrawn through connection 130, together with the vent gases from the vent tank where such a vent tank is employed for reducing the pressure between the absorbers and the preheater, and subjected to recompression for the recovery of its gasoline content. The recoverable gasoline content of this gas vapor mixture may amount to as much as 8 gallons per 1,000 cubic feet or more, although with increased cooling or better lagging, or by maintaining a higher pressure upon the receiver, the amount may be reduced to 2 gallons per 1,000 cubic feet or less.

The absorbing towers are designed in accordance with the quantity and quality of natural gas or gasoline to be treated. The preheater and exhausting column, and the heat exchangers and coolers for the liquid absorbent, are designed in accordance with the volume of absorbent employed from which gasoline is to be separated. The rectifying part of the tower, the dephelgmators and the condenser for the gasoline product are designed in accordance with the quantity and quality of gasoline to be recovered. For example, for treating about 8,000,000 cubic feet of gas per day under a pressure of about 30 to 40 pounds per square inch, two towers 9 feet in diameter, the gas and oil being contacted over a column about 26 feet high in each tower, can be used. Or for treating about 3,500,000 cubic feet of gas per day, two columns 6 feet in diameter effecting gas-abosrbent contact over a space of about 16 feet can be employed. In general, a linear gas velocity of about 0.5 feet per second in the absorbers can be used. The velocity should not be so great as to cause entrainment of the absorbent in the gas; too low velocity however makes the bulk of the apparatus excessive.

For the recovery of about 15,000 gallons of gasoline per day from about 300,000 gallons of absorbent, a preheater having a capacity equivalent to about 90 boiler horsepower can be used, for example, two fire tube boilers having 450 square feet of heating surface each can be employed. The design of the exhausting tower depends largely upon the type of tower construction employed: the desideratum in any case is the complete stripping of the absorbent. For the recovery of 15,000 gallons of gasoline per day from about 300,000 gallons of absorbent, a series of 20 bubble plates 5 feet in diameter and having 17 bubble caps 8 inches in diameter on each plate can be used. Another series of 10 similar plates, arranged in the tower above the liquid inlet can be employed as a rectifier.

The entire apparatus can be and preferably is thoroughly heat insulated or lagged to prevent heat loss; particularly the preheater, the exhausting column, the pressure reducing means and the connections between them. To assist in regulation of the operation, thermometers or other temperature indicating devices can be arranged in the gas inlets and outlets and absorbent inlets and outlets in the absorbers, on the inlets and outlets of the heat exchangers and the absorbent coolers, on the vapor and gas and the liquid outlets from the preheater, on the exhausting column inlets from the preheater and in the vapor outlet and liquid reservoir in the preheater, on the cooling fluid connections, the vapor inlets and outlets and the reflux return line of the dephlegmators, and on the condenser for the final gasoline product.

In place of using steam for direct introduction into the charge in the preheater, or into the exhausting column, stripped gas, for example, gas that has passed through the absorbers or tail gas from the recompression plant where the vent gases from the receiver are recompressed, may be employed. The stripped gas may be introduced at ordinary temperature for reducing the partial pressure of the absorbed gasoline constituents, or it may be heated before introduction for supplying heat as well as for assisting vaporization by reduction of the partial pressure of the gasoline constituents. Where such gas is introduced, it passes through the system with the gasoline vapors and can be separated from the condensed gasoline in the final receiver. Additional cooling of the final gasoline fraction may be desirable where stripped gas is employed in this manner.

The process of the invention has been more particularly described in connection with an operation in which superatmospheric pressure is maintained upon the charge in the preheater or preliminary still. In its broader aspect, however, the essential feature of the invention is the maintenance of a lower pressure in the exhausting column than that prevailing in the still, and the invention includes, in this broader aspect processes in which the pressure in the preheater is atmospheric or sub-atmospheric.

It will thus be seen that in carrying out the present invention, the gasoline charged absorbent is subjected to preliminary partial vaporization under a relatively higher pressure whereby the lighter absorbed constituents are separated as vapors and gases leaving a liquid residuum containing the heavier absorbed constituents, and, after reduction of pressure upon the separated gases and vapors and the liquid residuum, the liquid residuum is passed in countercurrent flow and in direct contact with the vapors and gases under a reduced pressure whereby the liquid residuum is relieved of the remaining absorbed heavier constituents and the gases and vapors at the same time are scrubbed free from any entrained or vaporized absorbent. Initial fractionation effected in the preliminary distillation treatment is desirable in that it effects a partial fractionation of the absorbed constituents, and the lighter vapors and gases thus separated are then employed as a fractionating agent in the recovery of the remaining absorbed gasoline constituents. Among the advantages thereby secured are a more complete stripping of the liquid absorbent and the maintenance of conditions in which lower vaporization temperatures can be employed. In the separation of absorbed gasoline from a liquid absorbent, any constituents which are left in the absorbent by incomplete stripping comprise the heaviest and most valuable fraction of the absorbed gasoline so that complete stripping is also desirable in this respect.

The complete process of the invention for the recovery of gasoline from natural gas and casinghead gas has several additional advantages. By a more complete stripping of the absorbent, the amount of absorbent it is necessary to circulate for the treatment of any given amount of gas or the recovery of any given amount of gasoline is descreased. This decreased amount of absorbent required reduces the amount of equipment and power required, for example, it permits the use of smaller pump capacity and smaller circulating lines. It also reduces the surface required in the heat exchangers and the coolers for cooling the denuded absorbent. Less heat is likewise required to distill the absorbed gasoline, thus permitting the use of smaller stills or stills with less heating surface as well as reducing the fuel consumption. The reduction in the amount of absorbent required likewise increases the thermal efficiency of the entire cycle since it decreases the total amount of absorbent alternately heated and cooled in the complete cycle of the process.

More complete stripping of the absorbent also improves the absorptive capacity of the absorbing medium, particularly with reference to the heavier gasoline constituents, enabling the recovery of higher yields of gasoline. The improved efficiency of the process of the invention in separating absorbed gasoline from the absorbing menstruum also enables the use of a lower temperature in the distillation treatment. The gasoline vapors are thus maintained at a lower temperature after they are separated from the absorbing medium, thereby decreasing the amount of cooling of the gasoline vapors required in dephlegmation and permitting a corresponding reduction in the size of the apparatus required for dephlegmation. Lower distillation temperatures also decrease the hazard involved in handling the hot absorbent. The lower distillation temperature also reduces the total amount of heat required to effect the distillation, and reduces the temperature range over which the absorbent is alternately heated and cooled in the entire cycle of the process.

The relative decrease in the amount of absorbent required for any given recovery of gasoline or for the treatment of any given amount of gas and the relative decrease in the temperature range involved in the process combine to decrease the total heat differential of the complete process, consequently increasing the practical thermal efficiency. The total heat required to be introduced into the cycle is thus decreased and the total heat required to be extracted from the cycle is likewise decreased. The first of these factors reduces fuel consumption, and the second, frequently the more important practically, reduces the amount of cooling required.

Conversely stated, the advantages above enumerated enable an increased recovery of gasoline with any given plant installation.

The invention also enables the production of an improved gasoline product. Due to the more complete stripping of the absorbent secured, the character of the absorbed constituents separated in the process of the invention is more uniform. More complete stripping of the absorbent also maintains the absorptive capacity of the absorbent more uniform and enables better control and regulation of the separation effected in the initial absorption treatment. The rectifying and dephlegmating treatments of the invention also assist in regulating and controlling the character of the final gasoline product. The more complete separation effected between the gasoline and the absorbent also improves the quality of the product.

I claim:

1. A process of separating absorbed gasoline from liquid absorbing mediums, which comprises subjecting the gasoline charged medium to a distillation treatment by the application of heat and passing the heated liquid residuum from the distillation treatment in countercurrent flow and in direct contact with the distilled vapors and gases under a pressure lower than that prevailing in the distillation treatment.

2. A process of separating absorbed gasoline from liquid absorbing mediums, which comprises heating the gasoline charged medium and vaporizing a part of the absorbed constituents, and thereafter vaporizing the remaining absorbed constituents by contacting the vaporized constituents and the hot absorbing medium containing unvaporized constituents from the initial vaporization treatment under a pressure lower than that prevailing in the first vaporization treatment.

3. A process of separating absorbed gasoline from liquid absorbing mediums, which comprises subjecting the gasoline charged medium to a distillation treatment by the application of heat, passing the hot liquid residuum from the distillation treatment in countercurrent flow and in direct contact with the distilled vapors and gases under a pressure lower than that prevailing in the distillation treatment, and subjecting the vapors and gases from the treatment effected at lower pressure to a rectification treatment.

4. A process of separating absorbed gasoline from liquid absorbing mediums, which comprises subjecting the gasoline charged medium to a distillation treatment by the application of heat, passing the hot liquid residuum from the distillation treatment in countercurrent flow and in direct contact with the distilled vapors and gases under a pressure lower than that prevailing in the distillation treatment, and subjecting the vapors and gases from the treatment effected at lower pressure to a dephlegmation treatment.

5. A process of separating absorbed gasoline from liquid absorbing mediums, which comprises subjecting the gasoline charged medium to a distillation treatment, passing the heated liquid residuum from the distillation treatment in countercurrent flow and in direct contact with the distilled vapors and gases under a pressure lower than that prevailing in the distillation treatment, and introducing a gasoline charged medium into the vapors and gases from the treatment effected at lower pressure.

6. A process of separating absorbed gasoline from liquid absorbing mediums, which comprises subjecting the gasoline charged medium to a distillation treatment by the application of heat under a relatively higher pressure, reducing the pressure upon the distilled vapors and gases and upon the hot liquid residuum from the distillation treatment, passing the hot liquid residuum in countercurrent flow and in direct contact with the distilled vapors and gases under a relatively lower pressure, and employing the additional pressure prevailing in the distillation treatment for forcing the liquid residuum to the treatment effected at lower pressure.

7. A process of recovering gasoline from natural gas, casinghead gas and the like, which comprises subjecting the gas to an absorption treatment with a liquid absorbing medium for the gasoline, subjecting the gasoline charged medium from the absorption treatment to a distillation treatment by the application of heat, passing the heated liquid residuum from the distillation treatment in countercurrent flow and in direct contact with the distilled vapors and gases under a pressure lower than that prevailing in the distillation treatment, and condensing and collecting the separated gasoline product.

8. A process of recovering gasoline from natural gas, casinghead gas and the like, which comprises subjecting the gas to an absorption treatment with a liquid absorbing medium for the gasoline, subjecting the gasoline charged medium from the absorption treatment to a distillation treatment by the application of heat, passing the heated liquid residuum from the distillation treatment in countercurrent flow and in direct contact with the distilled vapors and gases under a pressure lower than that prevailing in the distillation treatment, and cooling and returning to the absorption treatment the denuded absorbing medium from the treatment effected at lower pressure.

9. A process of recovering gasoline from natural gas, casinghead gas and the like, which comprises subjecting the gas to an absorption treatment with a liquid absorbing medium for the gasoline, subjecting the gasoline charged absorbing medium from the absorption treatment to a distillation treatment by the application of heat, passing the heated liquid residuum from the distillation treatment in counter current flow and in direct contact with the distilled vapors and gases under a pressure lower than that prevailing in the distillation treatment, and subjecting the vapors and gases from the treatment effected at lower pressure to a rectification treatment.

10. A process of recovering gasoline from natural gas, casinghead gas, and the like, which comprises subjecting the gas to an absorption treatment with a liquid absorbing medium for the gasoline, subjecting the gasoline charged absorbing medium from the absorption treatment to a distillation treatment by the application of heat, passing the heated liquid residuum from the distillation treatment in counter current flow and in direct contact with the distilled vapors and gases under a pressure lower than that prevailing in the distillation treatment, and subjecting the vapors and gases from the treatment effected at lower pressure to a dephlegmation treatment.

11. A process of recovering gasoline from natural gas, casinghead gas, and the like, which comprises subjecting the gas to an absorption treatment with a liquid absorbing medium for the gasoline, subjecting the gasoline charged absorbing medium from the absorption treatment to a distillation treatment, passing the heated liquid residuum from the distillation treatment in countercurrent flow and in direct contact with the distilled vapors and gases under a pressure lower than that prevailing in the distillation treatment, and introducing into the vapors and gases from the treatment effected at lower pressure a part of the gasoline charged absorbent from the absorption treatment.

In testimony whereof I affix my signature.

HAROLD B. BERNARD.